US012764567B2

(12) United States Patent
Shire et al.

(10) Patent No.: US 12,764,567 B2
(45) Date of Patent: Oct. 13, 2026

(54) FAULT-TOLERANT VEHICLE COMMUNICATIONS

(71) Applicant: Volvo Truck Corporation, Gothenburg (SE)

(72) Inventors: Joshua Shire, Gothenburg (SE); Roman Iustin, Mölnlycke (SE); Ulf Stenbratt, Vallda (SE)

(73) Assignee: Volvo Truck Corporation, Gothenburg (SE)

(*) Notice: Subject to any disclaimer, the term of this patent is extended or adjusted under 35 U.S.C. 154(b) by 840 days.

(21) Appl. No.: 17/825,357

(22) Filed: May 26, 2022

(65) Prior Publication Data

US 2022/0394516 A1 Dec. 8, 2022

(30) Foreign Application Priority Data

Jun. 4, 2021 (EP) .................................... 21177693

(51) Int. Cl.
*H04W 24/04* (2009.01)
*H04L 67/12* (2022.01)
(Continued)

(52) U.S. Cl.
CPC ............ *H04W 24/04* (2013.01); *H04L 67/12* (2013.01); *H04W 84/005* (2013.01); *H04W 84/18* (2013.01)

(58) Field of Classification Search
CPC ... H04W 24/04; H04W 84/005; H04W 84/18; H04L 67/12
See application file for complete search history.

(56) References Cited

U.S. PATENT DOCUMENTS 8,233,389 B2 * 7/2012 Yim .................. H04W 28/0284 370/229
10,205,670 B2 * 2/2019 Tan ......................... H04L 47/32
(Continued)

FOREIGN PATENT DOCUMENTS

WO WO-2010020260 A1 * 2/2010 .............. H04W 4/02
WO 2015048995 A1 4/2015
WO WO-2021240054 A1 * 12/2021 .......... H04W 12/088

OTHER PUBLICATIONS

Massri, K. et al., "Routing Protocols for Delay Tolerant Networks: A Reference Architecture and a Thorough Quantitative Evaluation," Journal of Sensor and Actuator Networks, vol. 5, No. 6, Mar. 2016, MDPI, 28 pages.
(Continued)

*Primary Examiner* — Vivek Srivastava
(74) *Attorney, Agent, or Firm* — Withrow & Terranova, PLLC

(57) ABSTRACT

A method in a vehicle equipped with a long-range and a short-range interface comprises maintaining a connection to an access network using the long-range interface; recording a time and location at which the connection to the access network is operable; in case of failure of the connection to the access network, attempting to form a vehicle ad-hoc network (VANET) using the short-range interface; and sharing, with other vehicles in the VANET, the recorded time and location. Further, the vehicle may receive, from the other members of the VANET, a time and location at which the other members' connection to the access network was operable. From the time and location recorded by the vehicle and the time and location it receives, the vehicle derives coverage information indicative of a geographical boundary of an operable portion of the access network.

18 Claims, 4 Drawing Sheets

(51) Int. Cl.
*H04W 84/00* (2009.01)
*H04W 84/18* (2009.01)

(56) References Cited

U.S. PATENT DOCUMENTS

| | | | | |
|---|---|---|---|---|
| 10,313,864 | B2 * | 6/2019 | Kodaypak | H04W 4/90 |
| 10,631,228 | B2 * | 4/2020 | Miranda d'Orey | H04W 4/046 |
| 10,742,312 | B2 * | 8/2020 | Roy | H04B 7/18526 |
| 10,826,851 | B2 * | 11/2020 | Ergen | H04L 51/02 |
| 2009/0170537 | A1 * | 7/2009 | Mauti, Jr. | H04L 67/06<br>455/466 |
| 2012/0240062 | A1 | 9/2012 | Passmore et al. | |
| 2015/0264538 | A1 | 9/2015 | Klang et al. | |
| 2016/0021178 | A1 | 1/2016 | Liu et al. | |
| 2016/0227380 | A1 * | 8/2016 | Zhang | H04W 4/90 |
| 2016/0285960 | A1 | 9/2016 | Jodlauk et al. | |
| 2018/0054773 | A1 | 2/2018 | Miranda d'Orey et al. | |
| 2018/0091243 | A1 | 3/2018 | Xu et al. | |
| 2019/0059071 | A1 | 2/2019 | Khoryaev et al. | |
| 2020/0028804 | A1 | 1/2020 | Ergen | |
| 2021/0044946 | A1 | 2/2021 | Bhaskaran et al. | |
| 2023/0076030 | A1 * | 3/2023 | Baek | H04W 24/10 |

OTHER PUBLICATIONS

Extended European Search Report for European Patent Application No. 21177693.5, mailed Dec. 3, 2021, 10 pages.
First Office Action for Chinese Patent Application No. 202210568115.5, mailed Jan. 26, 2025, 22 pages.

* cited by examiner

FAULT-TOLERANT VEHICLE COMMUNICATIONS

RELATED APPLICATIONS

The present application claims priority to European Patent Application No. 21177693.5, filed on Jun. 4, 2021, and entitled "FAULT-TOLERANT VEHICLE COMMUNICATIONS," which is incorporated herein by reference in its entirety.

FIELD OF THE DISCLOSURE

The present disclosure relates to the field of vehicle communication and, in particular, to a method for ensuring vehicles a useful connection to the global Internet (or cloud) even in the absence of a stable access network connection.

BACKGROUND

A connected vehicle may at times experience periods of disconnection. These periods of disconnection may be due to the failure of a component of the vehicle's communication system or perhaps due to a geographic limitation of the coverage of the network the vehicle is connected to (among others). It is known in the art to provide vehicles with a redundant communication interface, to be able to set up—or switch to—a fallback connection on short notice.

For example, US2016285960 discloses a vehicle network comprising a first and a second vehicle each with a first and a second communication interface The first communication interface is a cellular link network interface and the second one is an ad-hoc network link interface. One vehicle may act to relay a message from the cellular link network to the second vehicle through the ad-hoc link interface.

US2018091243 discloses a vehicular media broadcast receiver comprising a first satellite network data interface. When data using the first interface is determined to be/become lost, a second network interface establishes an ad-hoc network to receive satellite network data from another vehicle.

WO2015048995 is directed to vehicles with a first and a second network interface, the first being a cellular network interface and the second being an ad-hoc IEEE 802.11 network. The vehicles switch from cellular to ad-hoc connectivity when they enter an "802.11 area". The 802.11 area, which can be determined in a centralized or distributed manner, shall contain other vehicles providing 802.11 connectivity that outperforms the cellular coverage. The extent of a "cellular area", in which cellular coverage is available, is monitored by a central entity. The cellular area and 802.11 area can overlap.

US2021044946 discloses steps for receiving local network measurement data including one or more connectivity metrics for at least one network provider (e.g., an ISP), and updating a geo-connectivity database using the received local network measurement data. The process can include additional steps for transmitting a geo-connectivity request to a remote Intelligent Vehicle Connectivity Analytics (IVCA) gateway, and steps for receiving a geo-connectivity reply from the remote IVCA gateway, where the geo-connectivity reply includes information regarding network availability for the at least one network provider along a vehicle path. In the context of US2021044946A1, the IVCA gateway is a measurement server responsible for taking connectivity measurements of large numbers of moving vehicles concurrently, and it updates each vehicle's Predictive Multi-homed WAN Switch (PMHS) with dynamic connectivity map changes at pre-configured or event-driven intervals. The PMHS units in multiple vehicles are able to form an alternate path successfully, where Car A, connected to a first provider path, can effectively be routed via Car C to a second provider path.

The existing architectures and mechanism by which a failing main connection can be replaced leave some to be desired as regards reliability, efficiency (overhead) or both.

SUMMARY

One objective of the present disclosure is to make available a method for managing temporary or localized failures of an access-network connection. It is a further objective to determine the geographical boundary of an operable portion of the access network. It is a still further an objective to provide access to coverage data collected by nearby vehicles. The present disclosure furthermore aims to propose a communication-enabled vehicle with similar capabilities.

At least some of these objectives are achieved by the invention as defined by the independent claims. The dependent claims relate to advantageous embodiments of the invention.

In a first aspect of the invention, there is provided a method in a vehicle which is equipped with a long-range interface and a short-range interface. The interfaces are wireless communication interfaces. The method comprises: maintaining a connection to an access network using the long-range interface; recording a time and location at which the connection to the access network was operable; in case of failure of the connection to the access network, attempting to form a vehicle ad-hoc network (VANET) using the short-range interface; and sharing, preferably over the VANET, said recorded time and location or coverage information derived therefrom with other members of the VANET.

Within this first aspect of the invention, thanks to the sharing of the recorded time and location (or coverage information derived therefrom) over the VANET, the vehicle can participate in a collaborative process of determining what parts, if any, of the access network are still operable. The collaborative process may include a distributed mechanism for finding the current limits of cellular coverage. Compared with the centralized monitoring of the "cellular area" in WO2015048995, collaborative process according to the present invention is not dependent on time-consuming and failure-prone uplink reporting, and it can therefore begin earlier. Another difference is the invention's use of local radio measurements, captured by each participating vehicle, which are likely to be denser and more plentiful than control and feedback information related to successfully completed transmissions in the cellular network.

In different embodiments, the knowledge relating to this boundary of the operable portion can be utilized to adapt connection maintenance and connection reestablishment activities. Such utilization includes postponing cell search until the vehicle re-enters the operable coverage area and/or sparsening periodic polling of a host (pinging, to monitor connection health) when the vehicle is leaving the coverage area.

In some embodiments, the vehicle determines whether the access network connection failure is local or general, and the vehicle acts differently depending on the applicable case. For example, the vehicle's buffered messages to an offboard computer may be treated differently. Unlike a static buffering mechanism, these embodiments make it possible to apprise the offboard computer, with minimal delay, of important status changes relating to the disconnected vehicles. As used herein, an "offboard computer" is a computer not comprised in any of the vehicles performing or participating in the method of the first aspect. In particular, an offboard computer may be fixedly installed, in which case it is not comprised in any vehicle.

According to some embodiments, the reestablishment of the access network connection triggers certain data transmissions to the offboard computer. The data may be the vehicle's buffered messages destined for the offboard computer, buffered messages destined for the offboard computer shared by other members of the VANET, coverage information, and/or identities of other members of the VANET which are disconnected from the access network. This brings the offboard computer swiftly up to date with the disconnected vehicles.

In a second aspect of the invention, there is provided a vehicle which is equipped with a long-range and a short-range interface. The vehicle further comprises processing circuitry (e.g., an onboard computer) which is configured to operate in accordance with the first aspect of the invention, as outlined above.

In third aspect of the invention, an offboard computer and a method in an offboard computer is proposed. It is appreciated that an offboard computer (or back-office system) is understood to be any type of host computer, server or networked processing equipment which is configured to communicate with vehicles. At least a portion of the communication link from the offboard computer to the vehicles may be provided by an access network. Typically, the offboard computer is not comprised in any vehicle. According to the method, the offboard computer: receives identities of vehicles that are currently disconnected from the access network, wherein the identifies are received from one of the vehicles which is connected to the access network; the offboard computer receives, from said connected vehicle, coverage information indicative of a geographical boundary of an operable portion of the access network; it updates a master coverage map using the received coverage information; and, on the basis of the updated master coverage map, the offboard computer routes a message destined for one of the currently disconnected vehicles via an outbound connected one of the vehicles. Here, an outbound vehicle may be a vehicle that is moving away from the access network and/or is approaching an area where the coverage of the access network is expected to be poorer.

The invention further relates to a computer program containing instructions for causing a computer—such as the vehicle processing circuitry or offboard computer in particular—to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order presented, unless this is explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
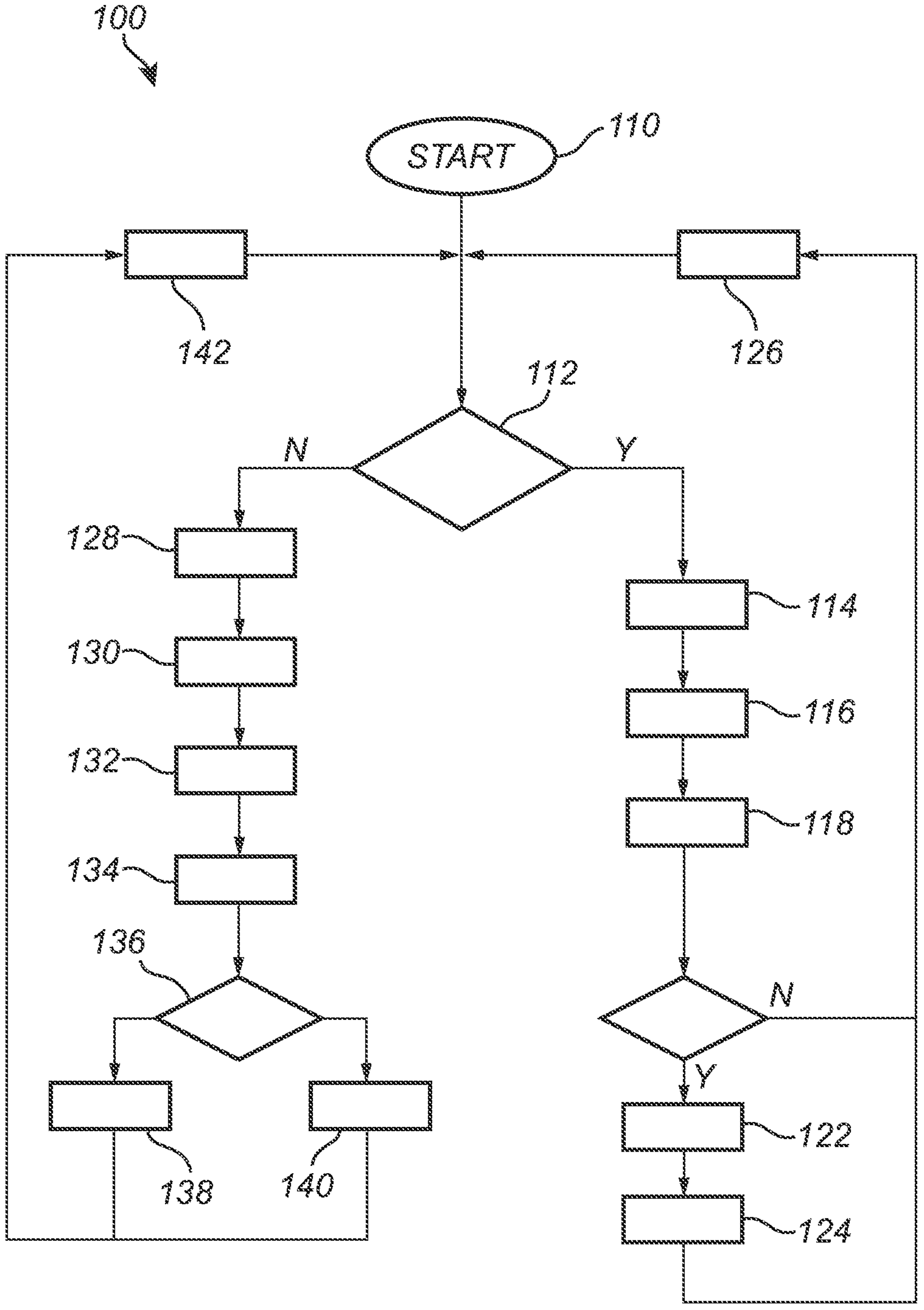
FIG. 1 is a flowchart of a method in a vehicle.
Figure 2:
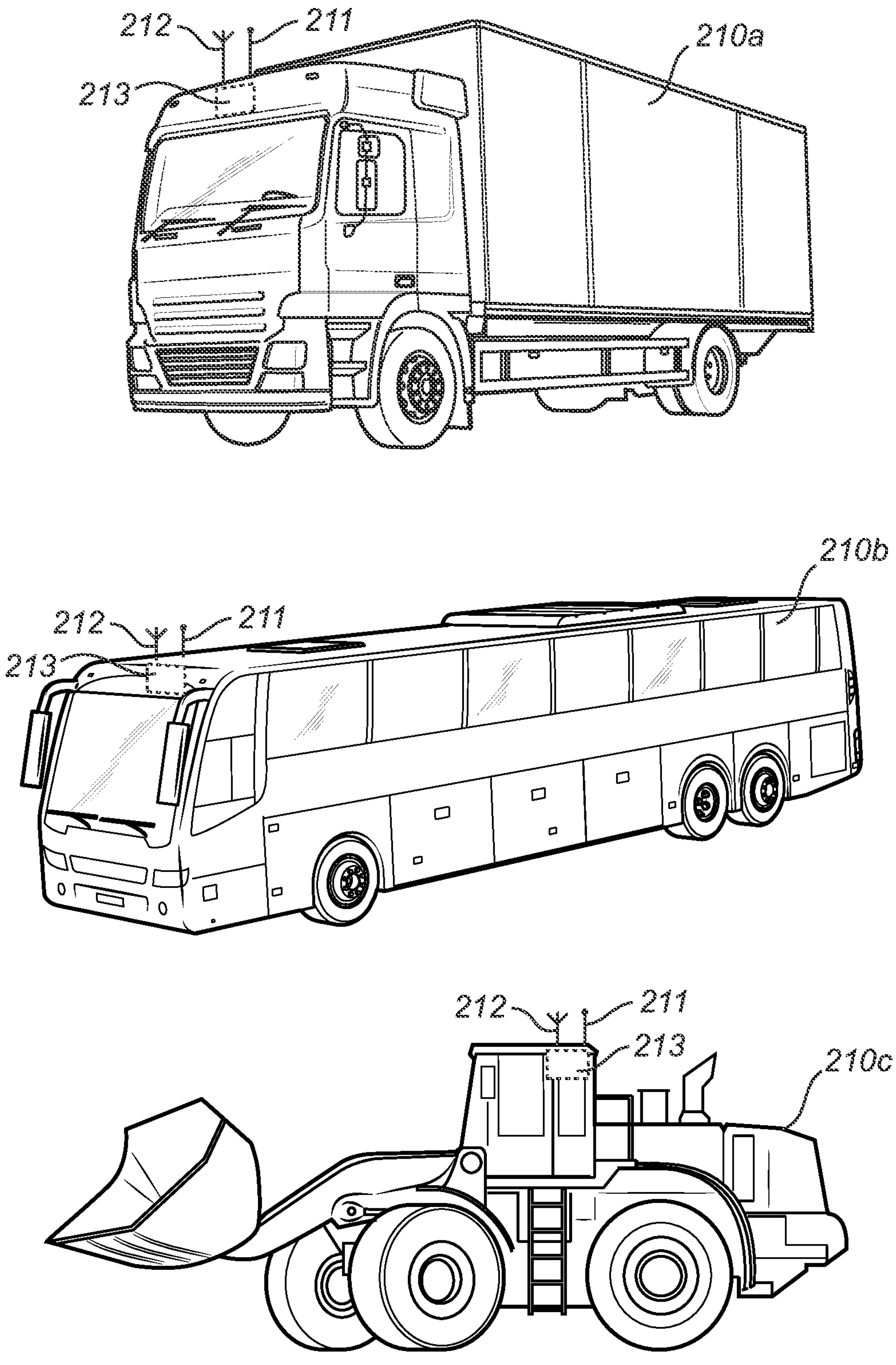
FIG. 2 show example vehicles equipped with a long-range and a short-range interface.

In what follows, a method 100 in a vehicle will be described with reference to FIG. 1. The method 100 is not restricted to any particular type of vehicle, which may for example be any of those depicted in FIG. 2—including a truck 210*a*, a bus 210*b* and a construction equipment vehicle 210*c*—provided the vehicle is equipped with a long-range interface 211 and a short-range 212 interface. Further, the method 100 can be implemented in a vehicle combination with two or more units, as long as one of the units is equipped with the mentioned long-range and short-range interfaces 211, 212. More precisely, the steps of the method 100 can be carried out by processing circuitry 213 in the vehicle 210, such as an onboard computer, telematics control unit (TCU) or the like.

Further, the vehicle 210 may have at its disposal a positioning functionality. The positioning functionality may be network-facilitated, including services provided using the 3GPP LTE Positioning Protocol (LPP). To enable positioning even outside network coverage, a network-facilitated positioning may be supplemented by a further positioning functionality, such as a global navigation satellite system (GNSS) receiver, an inertial measurement unit (IMU), or the like. Preferably, the positioning functionality is also operable to determine a bearing of the vehicle 210.

Each of the interfaces 211, 212 includes a radio transceiver, which may comprise one or more baseband processors connected to at least one antenna or antenna array. The long-range interface 211 may be configured for use with an access network 330 (FIG. 3) which is a cellular network (e.g., networks compliant with 3GPP UMTS, LTE or NR or similar telecommunication standards) or a satellite communication network. Clearly, a cellular interface is adapted to establish and maintain a radio link over a distance up to the expected largest cell radius, such as 1-10 km, whereas a satellite interface may be configured for radio communication over distances of the order of 1000 km (satellites in low-earth orbit) or 35 000 km (satellites in geostationary orbit).

The short-range interface 212 is used primarily to communicate with relatively nearby vehicles. On the one hand, the short-range interface 212 can enable communication between the vehicle 210 executing the method 100 and other vehicles experiencing similar radio conditions in respect of the access network, such as a loss of coverage or a connection failure. On the other hand, the vehicle 210 may use the short-range interface 212 to set up a one-hop or multi-hop connection to another vehicle that has an operable connection to the access network, and have important incoming and/or outgoing messages relayed by the other vehicle. The short-range interface 212 may for example be a Bluetooth interface, a Bluetooth low-energy (BLE) interface, an IEEE 802.11 interface, an IEEE 802.11bb (LiFi) interface, an IEEE 802.11p interface, Dedicated Short Range Communication (DSRC) on 802.11p, an IEEE 802.15.4 interface, a LoRa interface, an LTE or NR sidelink interface, a C-V2X interface, a radar, a ZigBee interface, an Ultra-Wideband (UWB) interface. In particular, a radar-based short-range interface 212 may be a functionality implemented by means of a radar unit which is additionally used for ranging or sensing in the conventional fashion.

To summarize, the long-range interface 211 may be adapted or specified for a maximum radio path length which corresponds to the vehicle's 210 distance to the closest network infrastructure in the access network. The long-range interface 211 differs in this respect from the short-range interface 212, which is adapted or specified for a maximum radio path length which corresponds to the expected spacing of neighbor or next-neighbor vehicles in the same traffic system. The specified distance may correspond to physical properties of radio waves in the radio spectrum used.

Figure 3:
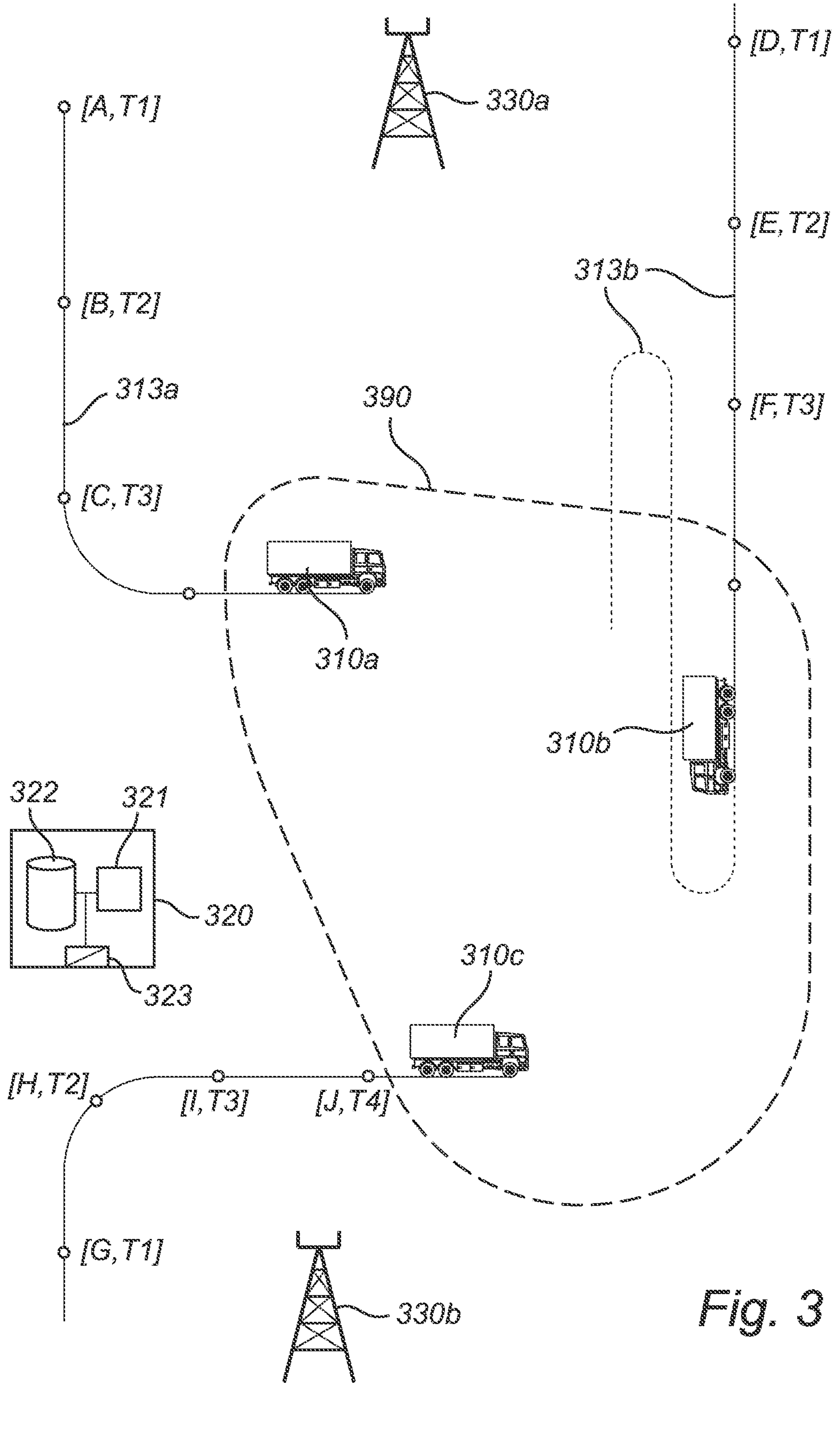
FIG. 3 shows a traffic system including an offboard computer communicating with multiple vehicles.

FIG. 3 illustrates a traffic system in which a plurality of vehicles 310 move along respective paths 313 shown in solid line (past trajectory) and finely dashed line (future trajectory). The vehicles 310 may be of such type and may include such wireless communication equipment as was discussed in connection with the vehicles 210 depicted in FIG. 2. In at least a portion (geographical portion) of the traffic system, the vehicles 310 are served by network equipment 330 of a radio access network, which is compatible with the long-range interfaces 211 of the vehicles 310. The vehicles 310 of the traffic system are configured to communicate with an offboard computer 320, primarily via the radio access network 330. The offboard computer 320 may provide various information services to the vehicles 320, for example street map updates, traffic reports, emergencies, logging, data backup. Alternatively or additionally, the offboard computer 320 may be authorized to control the movement of the vehicles 310 and/or perform fleet management. The fleet management may include tasks such as strategic decision-making (e.g., assigning missions), tactical decision-making (e.g., resolving resource utilization conflicts among the vehicles), safety-related tasks, remote status monitoring, remote maintenance (e.g., software upgrades) and similar tasks. The offboard computer 320 may include processing circuitry 321, a memory 322 and a communication interface 323 towards the access network. The communication interface 323 may interface directly with the access network 330, or the communications to and from the vehicles 310 may be routed through a portion of the global Internet, through a wired core network associated with the access network 330 and/or pass via a relaying vehicle 310.

The offboard computer 320 may implement a message queuing and routing functionality, such as a Message Queuing Telemetry Transport (MQTT) broker or an endpoint of the applicant's proprietary TiSP protocol. The detailed functioning of the offboard computer 320 will be described below with reference to FIG. 5.

Returning to FIG. 1, the execution of the method 100 in a vehicle may for example begin at the starting point 110, from which it proceeds to a state of (establishing, if necessary, and) maintaining 112 a connection to the access network 330 using the long-range interface 211. The maintenance 112 may be unsuccessful, corresponding to a failure of the connection, or it may be successful in the sense that the connection is still operable. To obtain a simple indication of the connection status, the connection maintenance step 112 may include repeatedly polling (or pinging) the offboard computer 320. If the vehicle receives the expected reply from the offboard computer 320, it will conclude that the access network connection is operable. Conversely, a connection failure may be deemed to exist if no reply is received within a predetermined period of time; optionally, the vehicle may apply a criterion to the effect that the absence of reply shall be repeatable two, three or even more times for a connection failure to be confirmed. The polling endpoint (i.e., the vehicle) may take the form of an HTTP host implementing a RESTful API accessible with a fully qualified domain name (FQDN) that is resolvable and accessible over the Internet. The Simple Text Orientated Messaging Protocol (STOMP) over web sockets, CBOR/CoAP, MQTT, etc. may also be used. Preferably, the vehicle initiates connection to the offboard computer 320; equivalently, in the case of STOMP over web sockets, the vehicle waits for a regularly occurring keep-alive communication and, after a defined threshold of missed polls or received keep-alive, notes itself as disconnected.

If the access network connection is successfully maintained (Y branch), the vehicle goes on to obtain 114 its current location. The vehicle may obtain the location by querying the access network 330 or having recourse to a different (autonomous or externally aided) positioning functionality. The vehicle then records 116 the location and time, e.g., by storing this data in a memory. By consulting the stored information later, if a connection failure occurs, the vehicle will be able to ascertain the time and location at which the connection to the access network was most recently operable. Within the present method 100, and as suggested in FIG. 3 by the location—time entries associating locations A, B, C, D, . . . and times T1, T2, T3, T4, each vehicle may optionally maintain a plurality of such data entries. This may enable the vehicle 310 to detect trends in network coverage, estimate the evolution with respect to time or space, and generally speaking produce more detailed or more reliable coverage information.

Still referring to the case where the access network connection is operable, the vehicle may further exchange 118 messages with the offboard computer 320. Example purposes of the messages include facilitating vehicle operation and performing remote maintenance; as such, the messages may encode fault codes, dispatch and mission data, traffic and environmental data, and the like. The exchanged messages may be for the benefit of the vehicle itself. The vehicle can also accept to assist the offboard computer 320 by acting as a relay of messages destined such for other vehicles which currently lack an operable connection to the access network; the messages are transferred from the offboard computer 320 and stored temporarily in a memory in the vehicle. Whether or not the offboard computer 320 makes use of this option, the vehicle has a readiness to receive 120 and respond to incoming invitations, from other vehicles, to join a vehicle ad-hoc network (VANET). If such an invitation is received (Y branch), the vehicle reacts by joining 122 the VANET using the short-range interface 212. Having joined the VANET, the vehicle will also accept relaying 124 messages from other members of the VANET (i.e., other vehicles) to the offboard computer 320. The vehicle will carry out such relaying as long as its own connection the access network is operable. If the offboard computer 320 has requested the vehicle to relay messages destined for another vehicle and said other vehicle is a member of the VANET that the vehicle has joined, then the vehicle will deliver these messages to the other vehicle. It is advantageous to operate the VANET using a delay-tolerant network protocol or protocol suite. For an overview of such protocols, see K. Massri et al., "Routing Protocols for Delay Tolerant Networks: A Reference Architecture and a Thorough Quantitative Evaluation", *Journal of Sensor and Actuator Networks*, vol. 5 (2016), issue 2, no. 6, doi: 10.3390/jsan5020006. If no VANET invitation is received (N branch from step 120), the execution of the method 110 returns to connection maintenance 112 after an optional delay 126.

If instead the access network connection has failed (N branch from step 112), the vehicle may initiate 128 buffering of messages destined for the offboard computer 320. The buffering may apply to all generated messages or may be restricted to messages having a predefined minimum importance or priority level. The later handling of any buffered messages in the vehicle will depend on the nature of the connection failure, as will be described below. Next, the vehicle attempts 130 to form a VANET using the short-range interface 212. The forming 130 of the VANET may correspond to setting up a new VANET, or the vehicle may join an already existing VANET. When the vehicle is a member of the VANET, it shares 132 the time and location, which were recorded in step 116, with other members of the VANET. Alternatively, if the vehicle has processed one or more location—time entries into coverage information, the vehicle may instead share the coverage information with the other VANET members. The vehicle may share 132 the location—time entries in association with its vehicle identity number (VIN), chassis ID and/or current heading. From at least one other member of the VANET, the vehicle may receive entries indicating a time and location at which the other member's connection to the access network was operable. Similarly, the other VANET member may share coverage information with the vehicle, wherein the coverage information may have been prepared on the basis of the sharing VANET member's own location—time entries or on information which it has received, in turn, from still further VANET members.

In this context, coverage information may for example constitute a map or a database. A suitable format of the map is a computer-readable representation of a geographical area (e.g., GNSS coordinates) which is annotated with coverage information. With reference to FIG. 3, it is specifically noted that the coverage information may be such as to indicate a geographical boundary 390 of an operable portion of the access network 330 (network edge). The boundary 390, which may be understood as the approximate limit of access-network coverage, may be estimated numerically by fitting a horizontal curve which is such that the recorded location—time entries lie on one side, and typically on the same side as radio base stations or other terrestrial access points which are expected to provide coverage except during temporary outages. A further option is to configure the curve-fitting process such that if several VANET members report being disconnected from the access network 330 when they are in the vicinity of a particular radio base station, the boundary 390 may be estimated based on the assumption that this particular radio base station is currently out of order. A requirement that the disconnected vehicle's current location shall lie on an opposite side of the boundary 390 may be added as a further condition. Similarly, a known uncovered area (e.g., mine) can be assumed to always lie on the disconnected side of the boundary 390. Although theoretically the operable portion of the access network 330 is normally a bounded area, the curve-fitting process need not assume that the boundary 390 shall be a closed curve; rather, the available data (location—time entries) may be used to estimate a portion of the boundary 390 in the vicinity of the vehicle's past trajectory. The bearing of the vehicle which records a location— time entry may be relevant; if the vehicle has moved from a connected into a disconnected area, it may be assumed that the boundary 390 is non-parallel to the vehicle's bearing. The boundary 390 may be subject to a smoothness condition (differentiability, continuity etc.).

A vehicle's processing of location—time entries into coverage information may further be subject to a freshness constraint, e.g., entries older that ti seconds (minutes) are not allowed as input. For example, referring FIG. 3, a freshness constraint may indicate that the vehicles shall disregard the location—time entries [A, T1], [D, T1], [G, T1]. The freshness constraint may serve to exclude obsolete entries which are no longer helpful to identify the current extent of access network coverage. The constraint should not be configured to be overly stringent, however, as it might then eliminate data that could improve the spatial resolution of the coverage information and/or add a time evolution dimension to it. In relation to coverage information, a freshness constraint may be defined analogously; for example, the coverage information may be time-stamped with the oldest time value of the location—time entries from which it was produced.

The vehicle may use its knowledge of the estimated boundary 390 of the operable portion of the access network for purposes such as adapting the connection maintenance 112 and connection reestablishment activities. For example, cell search may be made sparser or may be postponed until the vehicle re-enters the operable coverage area. Similarly, when the vehicle is about leaving the coverage area, the polling of the offboard computer 320 may be sparsened (repeated less frequently) as it is likely to be unsuccessful anyway.

After the sharing 132 of location—time data (or, as the case may be, coverage information) with other members of the VANET, the vehicle transmits 134 a connectivity query to the other VANET members. On the basis of replies to the connectivity query, it then determines 136 whether the connection failure is local or general. For example, if none of the vehicles replying to the connectivity query are reporting that they have an operable connection to the access network, the determination 136 may conclude that the connection failure is general. Conversely, if the querying vehicle receives at least some positive replies, this suggests that the connection failure is local. The application-layer content of the connectivity query and reply may take the form of bidirectional CoAP or REST request and responses, MQTT, etc. The data payload of each of the messages may take the form of a structured data object such as CBOR, JSON, or ASN.1. The message may include an integrity protection and authentication scheme. In the Case of CBOR, it is possible to use CBOR object signing and encryption (COSE) to sign the message with a public/private keypair obtained from the PKI. The payload shall include at a minimum a binary value indicating whether connection-oriented communications are available to the queried vehicle.

As mentioned above, the handling of the vehicle's buffered messages will depend on this conclusion. More precisely, in case of a local connection failure (left branch from step 136), the buffered messages may be routed 138 to the offboard computer 320 via other members of the VANET. The connected other members of the VANET will directly relay the messages from the disconnected vehicle to the connected access network, and vice versa, in a connection-oriented fashion. If an 802.11 network (Wi-Fi) is used to form the VANET, then IP connectivity towards the offboard computer 320 may be directly provided. The disconnected vehicle may initiate communications directly towards the offboard computer 320 using its known IP address and existing communication protocol, such as MQTT or the applicant's proprietary Wireless Transport Protocol (WTP) etc. In this case, the connected vehicle will act as a layer-3 router for the disconnected vehicle. If BLE is used to form the VANET then CoAP over BLE may be used, in which case the connected vehicle will act as a CoAP proxy, re-encapsulating the BLE packets into IP packets destined towards the offboard computer 320. IEEE 802.1p V2V, LTE sidelink, IEEE 802.15.4 may also be used, though the network protocols may be different. In the example case of Zigbee over IEEE 802.15.4, native Zigbee network and session layer is used.

Alternatively, in case of a general connection failure (right branch from step 136), the buffered messages are shared 140 with other members of the VANET. The vehicle's sharing 140 of the buffered messages with the other members may increase the chances that one of the other VANET members will enter an area with access-network coverage earlier than the vehicle itself, so that the vehicle's messages to the offboard computer 320 are delivered sooner. In the interest of data protection, the vehicle may share 140 the buffered messages in an encrypted format that is readable only by the offboard computer 320.

The connectivity query may optionally include an indication whether the querying vehicle holds messages (buffered messages) from the offboard computer 320 which are destined for the queried vehicle. The queried vehicle can then request, at a time of its choice, the querying vehicle to transfer the message to itself. Further optionally, the connectivity query may further include an encryption configuration (e.g., a public key, a X.509 certificate), to enable safe transfer of the message if the queried vehicle requests such transfer.

The vehicles' exchange of buffered messages destined for or originating from the offboard computer 320 may use a protocol stack appropriate for the disconnected, delay-tolerant network with modifications to account for the knowledge of the coverage boundary 390. Example protocols include: a utility-based protocol like Probabilistic Routing Protocol (PROPHET), where the connected network is considered the destination node and the probability of a vehicle encountering it used as the utility metric; Motion Vector (MOVE), where the location of the destination node (the offboard computer 320) shall be the mapped boundary, o 390; a social-relationship based protocol where "friendliness" to the offboard computer 320 via the connected network is evaluated; other delay-tolerant network routing protocols. The application and session layer of the message exchange may take the form of bidirectional CoAP or REST request and responses, MQTT, etc. The data payload of the message may take the form of a structured data object, such as CBOR, JSON, or ASN.1. The message may include an integrity protection and authentication scheme, as exemplified for CBOR above.

The vehicle which has determined a failure in its connection to the access network 330 will, after an optional delay 142, poll the offboard computer 320 anew. As mentioned, the polling frequency may be reduced while the vehicle is estimated to be outside the operable portion of the access network. If no reply is received, the vehicle may conclude that the connection failure is still ongoing. If however the vehicle receives a reply from the offboard computer 320, it concludes that the connection to the access network 330 has been reestablished. (Needless to say, receiving a reply from the offboard computer 320 requires that the physical connection has been reestablished, which may be reflected as a status change in the lower protocol layers. In some embodiments, the physical-layer status change rather than the positive poll reply may be used as a decision criterion, which however may render it necessary to involve multiple protocol layers in the implementation of the method 100. In other embodiment, the polling of the offboard computer 320 may be used as uniform and therefore possibly convenient connection health criterion.) It is noted that the connection to the access network 330 can be reestablished either as a result of the vehicle's movement into a better-covered geographical area, whereby the cause of the local connection failure is removed, or because the access network infrastructure has resumed operation closer to its nominal performance—in other words, that a general connection failure has been cleared.

In reaction to finding that the connection to the access network 330 has been reestablished, the vehicle executes step 118, where it exchanges messages with the offboard computer 320. Under step 118 the vehicle may transfer (forward) one or more of the following to the offboard computer 320:

- the vehicle's buffered messages destined for the offboard computer,
- buffered messages destined for the offboard computer shared by other members of the VANET, e.g., using WTP over IP, MQTT etc.
- coverage information,
- identities of other members of the VANET which are disconnected from the access network.

The vehicle may further leave the VANET when the connection to the access network 330 has been reestablished. The vehicle does not necessarily need to leave the VANET actively, since the fact that the vehicle has moved into access-network coverage may imply that it is now physically separated from the remaining VANET members.

On the basis of the information received from the vehicle in step 118, the offboard computer 320 may update its map of disconnected zones based on the freshness of the coordinates within the received map a well as its database of vehicles within that zone (removing the vehicle which it now has a connection to). If the offboard computer 320 determines that communication with a vehicle inside the disconnected zone is required (e.g., a message is queued which is destined for a vehicle it believes to be within the disconnected network), the offboard computer 320 will utilize an appropriate protocol to determine which vehicles are likely to enter the disconnected zone shortly, and forward, to those vehicles, messages destined for vehicles within the zone. Potential protocols are once again probabilistic utility-based protocols while considering previous contact with vehicles within the disconnected zone. Alternatively or additionally, the offboard computer 320 may use a motion- or geolocation-based planning strategy which anticipates a vehicle's entry into the disconnected zone based on its current bearing, a planned trajectory generated by a fleet management functionality, or the vehicle's proximity to other particular vehicles. The offboard computer 320 may acknowledge the receipt of messages from vehicles within the zone to reduce data-traffic congestion.

To illustrate the behaviors just described, the snapshot vehicle positions in FIG. 3 are such that neither of vehicles 310*a*, 310*b*, 310*c* is in reliable coverage of the access network, and it may be expected that vehicles that execute software implementing the method 100 will attempt to form a VANET among themselves. This will benefit the vehicles' 310 communication with the offboard computer 320 as the future path 312*b* of the second vehicle 310*b* will take it into coverage, whereby its connection to the access network can be restored and the delivery of buffered messages can be effectuated. This applies to the vehicle's 310*b* own messages as well as those messages which it has accepted from the other vehicles 310*a*, 310*c*.

Figure 4:
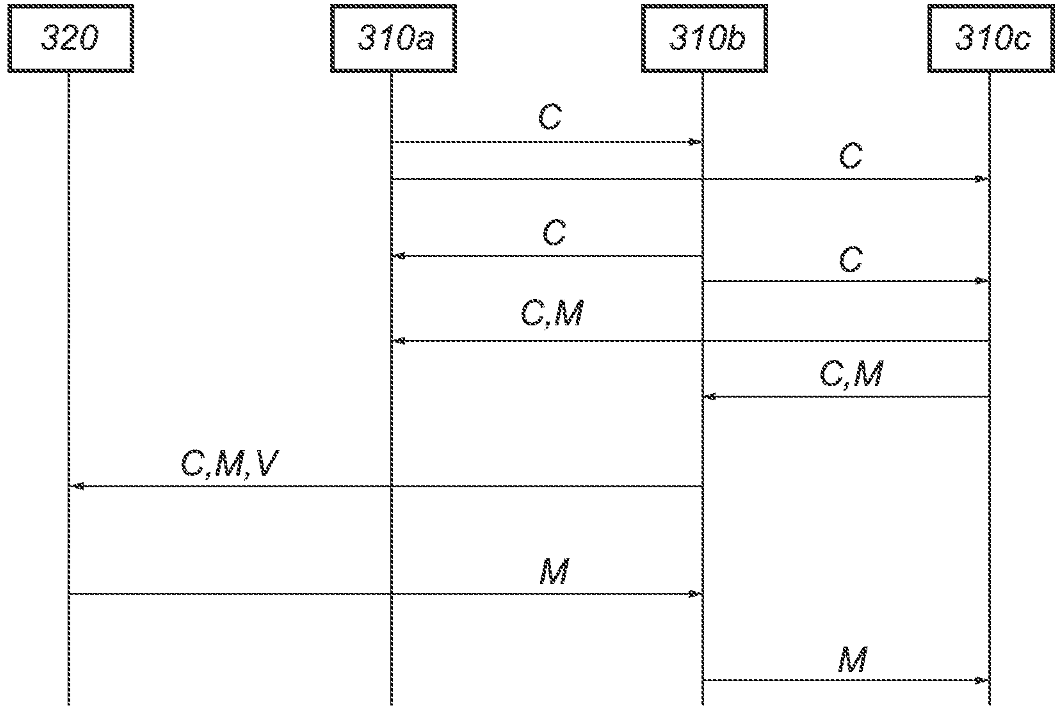
FIG. 4 is a sequence diagram showing communications exchanged among onboard computers (in vehicles) and an offboard computer.

The exchange of messages may be as shown in the sequence diagram in FIG. 4, where the downward vertical direction represents an approximate time scale and the following notation is used:

C coverage information

M buffered message destined for or originating from the offboard computer 320

V list of vehicles which are members of the VANET

Initially none of the vehicles 310*a*, 310*b*, 310*c* has an operable connection to the access network 330. The vehicles 310*a*, 310*b*, 310*c* share coverage information C with each other, in the form of times and locations at which their connections to the access network 330 were last operable or in the form of a boundary 390, a coverage map or the like. Each vehicle which establishes, based on replies to connectivity queries, that there is a general connection failure can choose to share any buffered messages destined for the offboard computer 320 that it holds. The third vehicle 310*c* makes use of this option. At least in such embodiments where the vehicles 310*a*, 310*b*, 310*c* do not share future trajectories with each other, the third vehicle 310*c* is unaware which of the two other vehicles 310*a*, 310*b* will leave the disconnected zone first, and therefore shares the buffered message M with both of these. As shown in FIG. 3, it will be the second vehicle 310*b* that delivers the second vehicle's 310*b* buffered message M to the offboard computer 320. It delivers the message M together with coverage information C and a list V of the vehicles that are members of the VANET. From the offboard computer 320, the second vehicle 310*b* receives an outbound message M destined for the third vehicle 310*c* and buffers it. When the second vehicle 310*b* reenters the disconnected zone (cf. FIG. 3) and joins a VANET where the third vehicle 310*c* is a member too, then the second vehicle 310*b* may deliver the outbound message M. It is emphasized that the offboard computer 320 is free to appoint a different vehicle than the second vehicle 310*b* for the delivery of the outbound message M to the third vehicle 310*c*.

Figure 5:
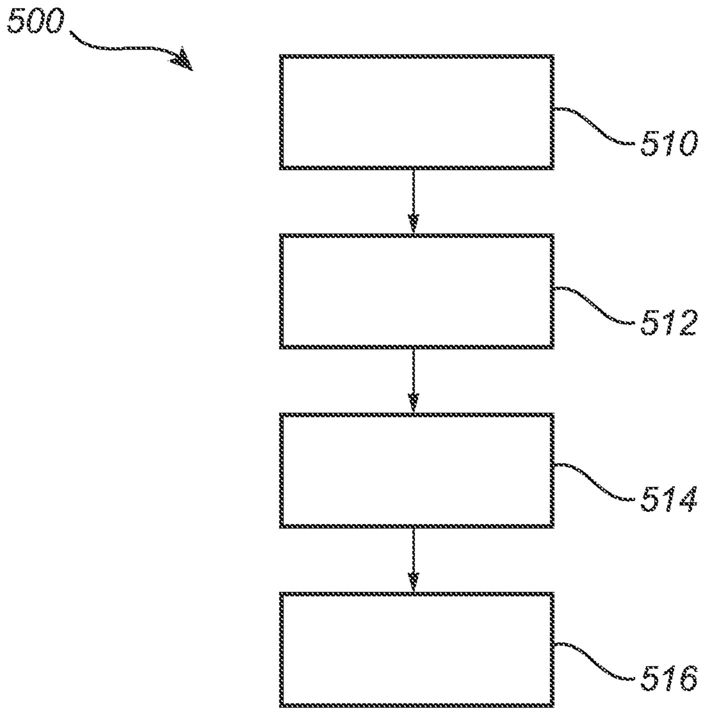
FIG. 5 is a flowchart of a method in the offboard computer.

FIG. 5 is a flowchart of a method 500 in the offboard computer 320. The method 500 may be executed in conjunction with the vehicle-side method 100. As already described, the offboard computer 320 is configured to communicate with multiple vehicles 310 via an access network 330. According to this embodiment, it is furthermore configured to maintain a master coverage map.

A first step 510 of the method 500 is executed while the offboard computer 320 has an operable connection to a vehicle. From the vehicle, the offboard computer 320 receives identities (FIG. 4: V) of currently disconnected vehicles. A vehicle's typical way of obtaining such information is by being a member of a VANET.

In a second step 512, the offboard computer 320 receives, from said connected vehicle, coverage information (FIG. 4: C) indicative of a geographical boundary 390 of an operable portion of the access network. Optionally, the offboard computer 320 also receives a buffered message which the vehicle has received from a second vehicle while it was disconnected, which buffered message was generated by the second vehicle.

Once the offboard computer 320 has received the coverage information, it updates, in a third step 514, the master coverage map.

In a subsequent step 516 of the method 500, the offboard computer 320 routes a message destined for one of the currently disconnected vehicles via an outbound connected one of the vehicles. The selection of the currently disconnected vehicle and/or the selection of the outbound vehicle may be made on the basis of the updated master coverage map. It may also take path planning information into account; such information may be available from a fleet management functionality for which the offboard computer 320 is responsible. Normally, the selection of the outbound vehicle is independent of whether or not that vehicle has delivered a buffered message on another vehicle's behalf.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a vehicle equipped with a long-range interface and a short-range interface, the method comprising:

maintaining a connection to an access network using the long-range interface;

recording a time and a location at which the connection to the access network is operable;

in response to failure of the connection to the access network, attempting to form a vehicle ad-hoc network (VANET) using the short-range interface; and sharing over the VANET, with other members of the VANET, the recorded time and location, or coverage information derived from the recorded time and location, wherein the method further comprises, in response to failure of the connection to the access network, at least one of the following steps:

(i) from at least one other member of the VANET, receiving a time and a location at which the at least one other member's connection to the access network was operable; and from the recorded time and location and the received time and location, deriving coverage information indicative of a geographical boundary of an operable portion of the access network; and (ii) transmitting a connectivity query to other members of the VANET, and determining, on the basis of replies to the connectivity query, whether the connection failure is local or general.

2. The method of claim 1, comprising, in response to failure of the connection to the access network, from at least one other member of the VANET, receiving a time and a location at which the at least one other member's connection to the access network was operable; and from the recorded time and location and the received time and location, deriving coverage information indicative of a geographical boundary of an operable portion of the access network.

3. The method of claim 2, wherein the deriving of coverage information is subject to a freshness constraint which excludes inputting time and location entries older than a certain time.

4. The method of claim 2, wherein:
- maintaining the connection to the access network comprises repeatedly polling an offboard computer, which is not located in any member of the VANET; and
- a repetition frequency of the polling is adapted in accordance with the location of the vehicle relative to the geographical boundary.

5. The method of claim 1, comprising, in response to failure of the connection to the access network, transmitting a connectivity query to other members of the VANET and determining, on the basis of replies to the connectivity query, whether the connection failure is local or general.

6. The method of claim 5, wherein the connectivity query includes an indication whether the vehicle transmitting the connectivity query holds a message from an offboard computer destined for the vehicle receiving the connectivity query.

7. The method of claim 5, further comprising:
- in response to failure of the connection to the access network, initiating buffering of messages destined for an offboard computer;
- in response to a local connection failure, routing the buffered messages to the offboard computer via other members of the VANET; and
- in response to a general connection failure, sharing the buffered messages with other members of the VANET.

8. The method of claim 7, further comprising, when the connection to the access network is reestablished, forwarding to the offboard computer one or more of:
- the buffered messages of the vehicle destined for the offboard computer;
- buffered messages destined for the offboard computer shared by other members of the VANET;
- the coverage information; and
- identities of other members of the VANET which are disconnected from the access network.

9. The method of claim 6, further comprising:
- joining a VANET in reaction to an invitation; and
- relaying messages from other members of the VANET to the offboard computer while the connection to the access network is operable.

10. The method of claim 1, wherein the VANET uses a delay-tolerant network protocol.

11. A vehicle comprising:
- a long-range interface operable to connect to an access network;
- a short-range interface; and
- processing circuitry configured to perform the method of claim 1.

12. The vehicle of claim 11, wherein the long-range interface comprises at least one of a cellular interface and a satellite interface.

13. The vehicle of claim 11, wherein the short-range interface comprises at least one of a Bluetooth interface, a Bluetooth low-energy interface, an IEEE 802.11 interface, an IEEE 802.11bb interface, an IEEE 802.11p interface, an IEEE 802.15.4 interface, a LoRa interface, an LTE or NR sidelink interface, a C-V2X interface, a radar, a ZigBee interface, and an Ultra-Wideband interface.

14. A method in an offboard computer configured to communicate with multiple vehicles via an access network, the method comprising:
- receiving, from one of the vehicles which is connected to the access network, identities of other vehicles which are currently disconnected from the access network;
- receiving, from the connected vehicle, coverage information indicative of a geographical boundary of an operable portion of the access network;
- updating a master coverage map using the received coverage information; and
- on the basis of the updated master coverage map, routing a message destined for one of the currently disconnected vehicles via an outbound connected one of the vehicles.

15. An offboard computer configured to communicate with multiple vehicles via an access network, the offboard computer comprising:
- a memory configured to store a master coverage map;
- a communication interface towards the access network; and
- processing circuitry configured to perform the method of claim 14.

16. The method of claim 14, further comprising selecting the outbound vehicle on the basis of the updated master coverage map.

17. The method of claim 16, further comprising selecting the outbound vehicle while taking into account path planning information.

18. The method of claim 17, wherein the path planning information is obtained from a fleet management functionality, for which the offboard computer is responsible.

* * * * *